Figure 1:
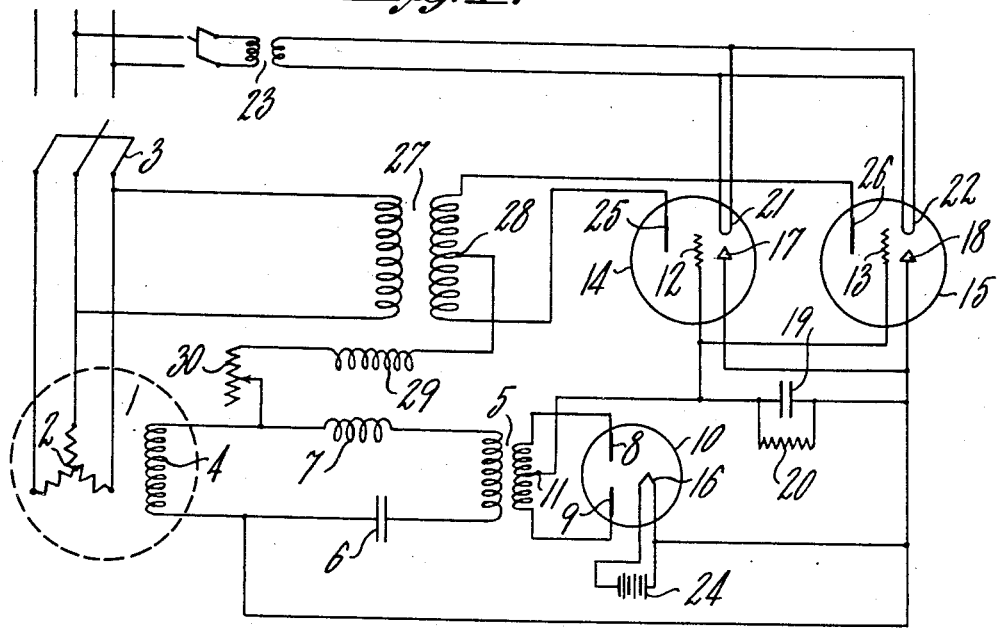

Feb. 21, 1939. J. A. BALMFORD 2,148,053
SYNCHRONIZING ALTERNATING CURRENT MOTORS
Filed June 24, 1937 2 Sheets-Sheet 1

INVENTOR.
JOSEPH ARTHUR BALMFORD
BY
ATTORNEY.

Note:- A & B are projections on the base line of the portions of curves 39 & 40 which are intercepted by the limits of the tube ionization area.

Patented Feb. 21, 1939

2,148,053

UNITED STATES PATENT OFFICE 2,148,053

SYNCHRONIZING ALTERNATING CURRENT MOTORS

Joseph Arthur Balmford, East Orange, N. J.

Application June 24, 1937, Serial No. 150,031

14 Claims. (Cl. 172—289)

This invention relates to control systems for alternating current motors, and more particularly to field control for synchronous machines. The field excitation is supplied by a novel type of rectification, a characteristic of this type of rectifier being utilized to control the flow of D. C. to the motor field, and the system may be designed to include either single or polyphase rectifiers.

One object of this invention is to insure automatically that the machine has reached substantially synchronous running speed before the D. C. field excitation is applied to the field winding.

Another important object is to provide a method of automatically controlling synchronous motors from either an adjacent or a remote point, by which pushbuttons or like simple devices are the only mechanisms required at the control station.

Another object of this invention is to improve the starting characteristics of synchronous machines by automatically withholding the D. C. field current until the machine is in approximate synchronism.

A further object is to automatically discontinue the field excitation when the machine falls out of synchronism due to overload, voltage dip, or any other reason, until such time as the rotor of the machine again attains substantially synchronous speed.

Still a further object is to provide a field control system that is positive in action, easily maintained, and free of time delay relays and like mechanical apparatus formerly used.

Other objects of this invention will appear from the following description when read in connection with the diagrams shown.

The particular type of rectifier tube here utilized to supply direct current excitation to the motor field winding is the grid controlled gaseous discharge tube. One form of these tubes is marketed under the trade name thyratron, and comprises a special purpose tube of heavy current carrying capacity. It has been found that this class of tubes will ionize and pass current within an appreciable range of control grid potentials instead of invariably ionizing at a definite and constant grid potential. Under different conditions of load, temperature, and other factors, ionization may occur in these tubes at many different values of control grid potential. In view of this condition it will be apparent that a system which automatically controls the application of field excitation, and which employs these tubes, might apply excitation prematurely at a point which is not sufficiently close to synchronous speed for best results.

Figure 2:
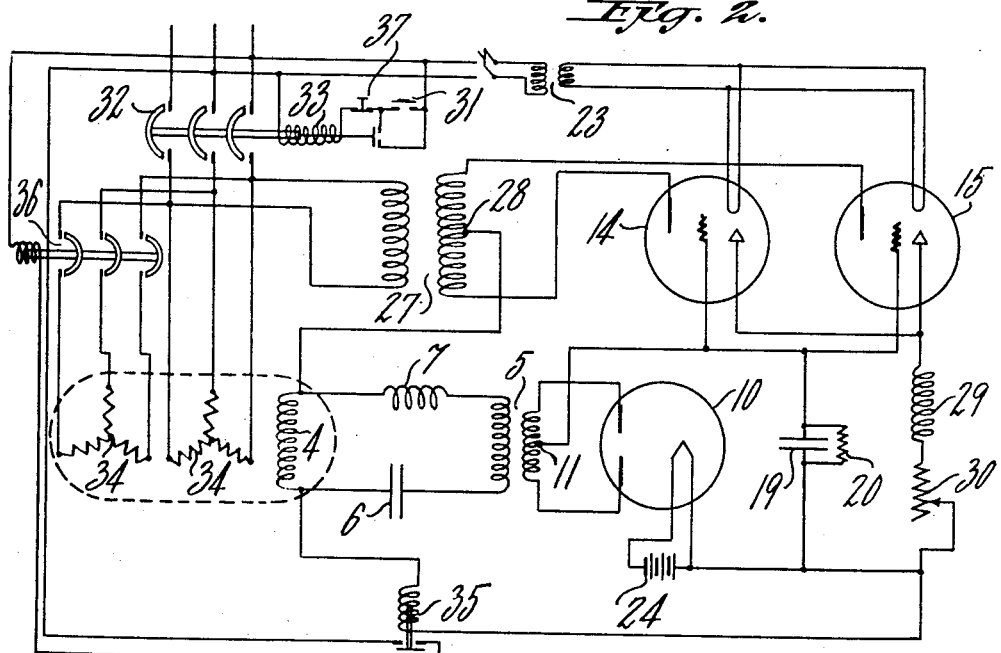
Figure 3:
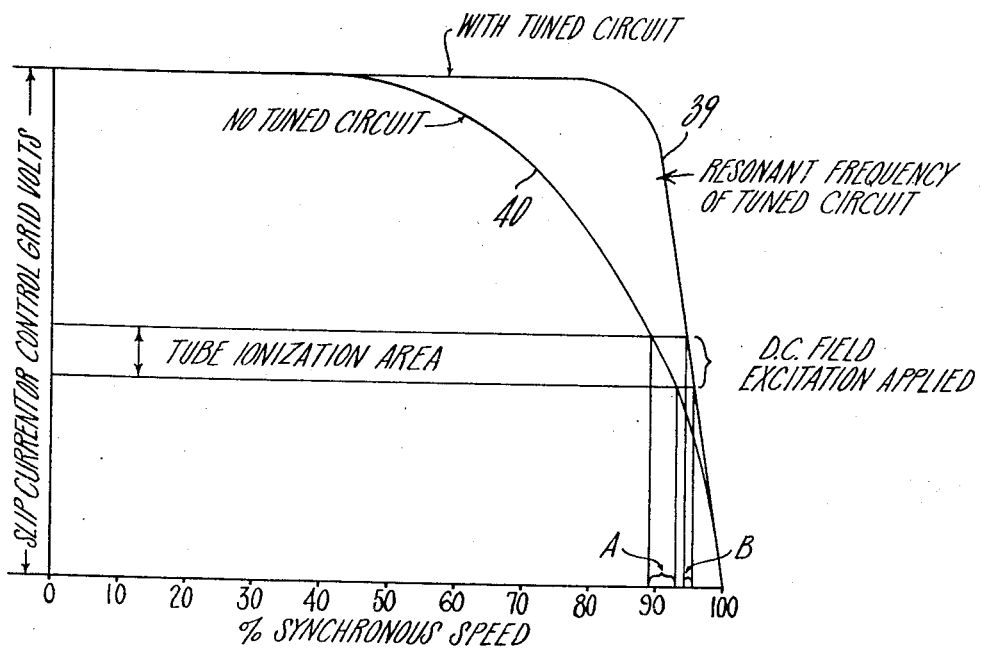

This present invention, which is a continuation in part of the application Serial No. 697,918, filed Nov. 14, 1933 and titled "Synchronizing alternating current motors", will disclose means by which the application of field excitation current may be withheld until approximately the desired percentage of synchronous speed has been attained by the rotor element of the synchronous motor, and is illustrated in the following drawings, in which:

Fig. 1 is a diagrammatic view of an embodiment of this invention showing a type of excitation control using space discharge tubes for controlling the application of field current to an alternating current synchronous motor; Fig. 2 is a diagrammatic view showing the application of this system of field current control to a two winding stator machine, and is arranged for remote automatic control; and Fig. 3 is a diagrammatic illustration of the operating characteristics of the control system as compared with prior art devices.

Referring to Fig. 1 of the drawings in more detail, the embodiment of the invention there shown comprises a synchronous motor 1, having its stator or armature winding 2 connected to a three phase A. C. supply circuit through switch 3, and having a field winding 4. The primary winding of a transformer 5, a condenser 6, and a reactance 7 are connected in series across the terminals of the field winding 4. In cases where the field winding and transformer primary afford a sufficient value of inductance in the circuit, the reactance 7 may be eliminated. The values of inductance and capacity are adjusted so that this circuit is in resonance at a frequency slightly higher than the slip frequency occurring at the percentage of synchronous speed at which D. C. field excitation is to be applied. It is generally recommended that field excitation be applied when the rotor reaches about 90 to 95% of synchronous speed. The particular circuit employed in experimental tests had a total inductance of 4 henries and a capacity of 200 microfarads, and with these circuit constants the field excitation was applied at about 95% of synchronous speed. It has been found that varying the resonant frequency of the control circuit will cause the application of field excitation at varying percentages of synchronous speed, but that when once adjusted for a definite resonant frequency, the speed at which field excitation is applied is substantially the same regardless of the rate of rotor acceleration. It will be apparent that both the condenser 6 and the reactance 7 may be variable. Continuing now with the description of Fig. 1, the secondary winding of transformer 5 has its ends connected to the anodes 8 and 9 respectively, of a full wave rectifier tube 10. The mid tap 11 of the secondary winding is connected to the control grids 12 and 13 of the above described main rectifier tubes 14 and 15. The cathode 16 of tube 10 is connected to cathodes 17 and 18 of main rectifier tubes 14 and 15, which are arranged to provide full wave rectification. A condenser 19 and a parallel resistance 20 are connected across the grids 12 and 13, and the cathodes 17 and 18 of the main rectifier tubes 14 and 15. The cathode heating elements 21 and 22 of rectifier tubes 14 and 15 may be supplied with current by a filament transformer 23 connected across the A. C. power line, or by any other suitable method such as a battery 24 which is shown as the current supply for filament 16 of tube 10. The main rectifier tubes 14 and 15 have their respective anodes 25 and 26 connected to the ends of the secondary winding of transformer 27. The mid tap 28 of this secondary winding is connected through a suitable inductance 29 and rheostat 30 to one terminal of the motor field winding 4. The other field terminal is connected to cathodes 17 and 18 respectively of the main rectifier tubes 14 and 15.

The operation of this invention as applied to the starting of a synchronous motor as an induction motor is as follows:

When a machine of this type is started, as by closing switch 3, current flows in the stator windings 2 and the rotor begins to revolve. If the excitation current is flowing through the field winding at this moment, considerable interference with the starting occurs. In this invention the field excitation current is withheld by automatic means until the machine has attained substantial synchronism as will now be stated in detail.

When the rotor starts, a voltage of slip frequency is induced in the field winding 4 and drops both in potential and frequency as synchronism is approached. Condenser 6 blocks any direct current, but allows the alternating slip frequency current to flow through the primary winding of transformer 5. A corresponding voltage is thus generated in the secondary winding and after being rectified by the full wave rectifier 10, passes through to charge the condenser 19 and impress a negative voltage on the grids 12 and 13 of the main rectifier tubes 14 and 15. This negative bias or potential on the grids prevents the tubes from ionizing and so passing current until the value of this biasing potential is reduced to the point at which ionization occurs. The tuned circuit comprising the field winding 4, condenser 6 and the primary winding of the transformer 5 presents a low impedance to the alternating slip current at the low frequencies occurring near synchronous speed. The current in this circuit does not drop substantially until the rotor is very close to the percentage of synchronous speed at which field excitation is to be applied, and then it falls sharply. Therefore, the range of ionization potentials of the rectifier tubes 14 and 15 lies on a steep downward slope of the control potential curve and the exact instant of tube ionization can consequently be closely regulated with respect to rotor speed. If the foregoing circuit comprised merely inductance and resistance, the slip current would fall gradually as the slip frequency decreased, and the exact rotor speed at which field excitation is applied would be more indeterminate due to the longer time interval required in passing through the range of ionizing potentials.

The relation of the control potential and rotor speed is illustrated by Fig. 3 which is purposely drawn in exaggerated form in order to more clearly present the essential advantages of the present invention over the prior art devices. In the diagram there shown, the ordinate may be either in terms of slip current as delivered from the field winding or in terms of the grid potential derived therefrom and applied to the main rectifier tubes. The abscissa is laid off in terms of rotor speed. The curve 39 illustrates the effect of the tuned circuit 4—6—7 of this invention, which presents a low impedance to the slip frequencies occurring in the upper percentages of synchronous speed and thereby causes the slip current and control voltage to be maintained at a fairly level value until the sharp drop occurs as synchronism is approached. The curve 40 illustrates the conditions when no tuned circuit is employed and it will be observed that the drop in control voltage is much more gradual. Since the control grid voltage at which the main rectifier tubes will ionize and consequently apply field excitation may cover a range of several volts, it is obvious that the degree of precision in applying field excitation depends upon the rate of change of the control potential. When the portion of the curve 40 which intersects the tube ionization area is projected upon the abscissa as at A, it is apparent that field excitation may be applied at any point over a considerable range of rotor speeds due to a relatively low rate of change of the control potential in this region. A similar projection of the curve 39, as at B, shows that the field excitation will be applied within a narrow range of rotor speeds due to the high rate of change of the control potential at this point. The arrow on curve 39 indicates that the resonant frequency of the tuned circuit 4—6—7 is slightly higher than the slip frequency obtaining when field excitation is applied.

If the machine falls out of synchronism due to overload, voltage dip, or other cause, a slip voltage will be induced in the field winding which will result in a negative bias on the rectifier grids 12 and 13, as before described. The main rectifiers 14 and 15 will cease to supply D. C. to the motor field as long as this negative bias is above the ionization point. As the rotor again comes up to synchronous speed, the induced slip voltage falls, causing a less negative potential on control grids 12 and 13, until the ionization point is passed whereupon the main rectifiers ionize and begin passing field excitation current once more.

The inductance 29 is inserted in the field circuit for the purpose of further smoothing the pulsating D. C. furnished by the main rectifiers, although it is not essential to the operation of this invention.

Referring now to Fig. 2 of the drawings, there is shown a modification of the present invention as applied to a two winding stator of a synchronous machine arranged for remote automatic control. When the switch 31 is closed, the contactor 32 is operated by its solenoid winding 33, closing the A. C. circuit and applying current to the winding 34 of the synchronous motor, and to the transformer 27. The rotor starts and when it has attained substantially synchronous speed, the field current is automatically supplied by the rectifiers 14 and 15 in the manner previously described. The flow of D. C. field current energizes relay 35, and closes the circuit which supplies current to the solenoid winding of contactor 36, which then closes and connects the second stator winding 34' of the synchronous machine to the A. C. supply line. Upon operation of the stopping switch 37, the solenoid 33 of contactor 32 is de-energized, thus opening the A. C. supply line and shutting down the machine. The automatic field excitation control performs the same functions and in the same manner as disclosed in the embodiment of the invention shown in Fig. 1.

Although full wave rectification is shown, a suitable type of half wave rectification might be employed without deviating from the inventive idea here disclosed and the system is applicable to either single or polyphase A. C. current supply.

While I have shown and described my invention as applied to a particular system and as embodying various devices diagrammatically indicated, changes and modifications will be obvious to those skilled in the art and my object is, therefore, to cover all such changes and modifications as fall within the true spirit and scope of my invention.

What I claim is:

1. In a synchronous motor control system, the combination of a motor having an armature winding and a field winding, means for applying power to said armature winding, means for exciting said field winding, rectifier means for controlling said field excitation means in response to slip voltage in said field winding, a transformer connected to said rectifier, and a circuit tuned to a predetermined frequency and including the primary winding of said transformer, said circuit being connected across said field winding.

2. In a synchronous motor control system, the combination of a motor having an armature winding and a field winding, means for applying power to said armature winding, thermionic means for exciting said field winding, a transformer having a primary winding included in a circuit containing said field winding and a capacity, said circuit being resonant at a predetermined frequency, a secondary winding on said transformer, a rectifier energized from said secondary winding, and means including said rectifier for controlling said field excitation means in response to slip voltage in said field winding.

3. In an alternating current motor control system, the combination of a motor having an armature winding and a field winding, means for supplying power to said armature winding, means for exciting said field winding, and control means including a circuit connected to said field winding and tuned to a predetermined frequency, a rectifier connected to said tuned circuit for rectifying any slip voltage developed in said field winding, and thermionic means responsive to the value of said rectified slip voltage for establishing and discontinuing the excitation current supply to said field winding.

4. In a synchronous motor control system, the combination of a motor having an armature winding and a field winding, means for supplying power to said armature winding, means for applying field excitation in response to a decrease in the slip voltage generated in said field winding, and means for augmenting the rate of change of slip current with respect to motor speed as synchronism is approached comprising a circuit connected across said field winding and tuned to a predetermined frequency.

5. In a synchronous motor control system, the combination of a motor having an armature winding and a field winding, means for supplying power to said armature winding, thermionic means for applying field excitation in response to a decrease in the slip voltage generated in said field winding, and means for augmenting the rate of change of slip current with respect to motor speed as synchronism is approached comprising a circuit connected across said field winding and tuned to a predetermined frequency.

6. In a synchronous motor control system, the combination of a motor having an armature winding and a field winding, means for supplying power to said armature winding, means including a grid controlled rectifier tube for applying field excitation in response to a decrease in the slip voltage generated in said field winding, and means for augmenting the rate of change of slip current with respect to motor speed as synchronism is approached comprising a circuit connected across said field winding and tuned to a predetermined frequency.

7. In a synchronous motor control system, the combination of a motor having an armature winding and a field winding, means for supplying power to said armature winding, means for exciting said field winding, a circuit tuned to a predetermined frequency and connected across said field winding, rectifier means for controlling said field excitation means in response to slip voltage generated in said field winding, and means for impressing the output of said tuned circuit upon said rectifier.

8. In a synchronous motor control system, the combination of a motor having an armature winding and a field winding, means for supplying power to said armature winding, means for exciting said field winding, a tuned circuit connected to said field winding and resonant to a slip frequency developed therein when said motor is operating between the limits of 85% to 95% synchronous speed, rectifier means for controlling said field excitation means in response to slip voltage generated in said field winding, and means for impressing the output of said tuned circuit upon said rectifier.

9. In a synchronous motor control system, the combination of a motor having an armature winding and a field winding, means for supplying power to said armature winding, means for exciting said field winding, a tuned circuit connected to said field winding and resonant to a slip frequency developed therein when said motor is operating at substantially 93% of synchronous speed, rectifier means for controlling said field excitation means in response to slip voltage generated in said field winding, and means for impressing the output of said tuned circuit upon said rectifier.

10. In a synchronous motor control system, the combination of a motor having an armature winding and a field winding, means for supplying power to said armature winding, means for exciting said field winding, means controlling said field excitation means in response to slip voltage and independently of slip frequency in said field winding, and a resonant circuit connected to said field winding whereby the rate of change of slip current with respect to motor speed may be altered.

11. In a synchronous motor control system, the combination of a motor having an armature winding and a field winding, means for supplying power to said armature winding, means for exciting said field winding, means controlling said field excitation means in response to slip voltage and independently of slip frequency in said field winding, and a tuned circuit connected to said field winding and resonant at a frequency higher than the slip frequency occurring in said field winding at the percentage of synchronous speed at which field excitation is to be applied.

12. In a synchronous motor control system, the combination of a motor having an armature winding and a field winding, means for supplying power to said armature winding, means for exciting said field winding, a circuit tuned to a predetermined frequency and connected across said field winding, means responsive to a direct current potential for controlling said field excitation means in accordance with variations in slip voltage generated in said field winding, and means for deriving a direct current varying in accordance with the slip current in said tuned circuit and impressing said direct current upon said field excitation control means.

13. In an alternating current motor control system, a power source, a motor having a field winding and a plurality of armature windings, means for supplying power to said armature windings, means for exciting said field winding, a circuit including said field winding and tuned to a predetermined frequency, means connected to said circuit and operating independently of frequency for maintaining excitation current only while said motor operates above 90% of synchronous speed, and means responsive to the flow of excitation current for closing and opening a circuit between said power source and an armature winding.

14. In an alternating current motor control system, a power source, a motor having a field winding and a plurality of armature windings, means for supplying power to said armature windings, means for exciting said field winding, a circuit including said field winding and tuned to a predetermined frequency, means connected to said circuit and operating independently of frequency for maintaining excitation current only while said motor operates above 90% of synchronous speed, and a relay responsive to the flow of excitation current for closing and opening a circuit between said power source and an armature winding.

JOSEPH ARTHUR BALMFORD.